United States Patent [19]

Tanaka et al.

[11] Patent Number: 5,450,446
[45] Date of Patent: Sep. 12, 1995

[54] DEMODULATOR FOR DIGITAL MODULATION SIGNALS

[75] Inventors: Koichiro Tanaka, Takarazuka; Toshikazu Nezu, Neyagawa, both of Japan

[73] Assignee: Matsushita Electric Industrial Co., Ltd., Osaka, Japan

[21] Appl. No.: 285,872

[22] Filed: Aug. 4, 1994

Related U.S. Application Data

[63] Continuation of Ser. No. 893,579, Jun. 4, 1992, abandoned.

[30] Foreign Application Priority Data

Jun. 6, 1991 [JP]  Japan ................................. 3-134886

[51] Int. Cl.[6] ..................................... H04L 27/14
[52] U.S. Cl. .................................. 375/324; 375/336; 375/348; 329/300
[58] Field of Search ........................ 375/78, 79, 11–15, 375/83, 88, 90, 80, 94, 99; 455/296; 328/165; 329/300, 303, 304, 315, 345, 349, 353

[56] References Cited

U.S. PATENT DOCUMENTS 3,855,539  12/1974  Croisier .
5,003,555   3/1991  Bergmans ............................. 375/12

FOREIGN PATENT DOCUMENTS 2627446   6/1976  Germany .
58-69153  4/1983  Japan .
60-220649 11/1985  Japan .
61-43048  7/1986  Japan .
8402819   7/1984  WIPO .

OTHER PUBLICATIONS

39th IEEE Vehicular Technology Confeence, 1–3 May 1989, San Francisco, California, vol. 1, pp. 44–49, Shigeru Ono et al.
40th IEEE Vehicular Technology Conference, 6–9 May 1990, Orlando, Florida, pp. 680–686, El-Tanany M. S. et al.

*Primary Examiner*—Stephen Chin
*Assistant Examiner*—Hai H. Phan
*Attorney, Agent, or Firm*—Price, Gess & Ubell

[57] ABSTRACT

The demodulator for digital modulation signals comprises a frequency detection device, an integral discharge filter, a summing device, a discrimination device, and a noise-compensating signal generation device. The frequency detection device outputs frequency detection signals by detecting frequencies of the digital modulation signals. The integral discharge filter outputs phase deviation signals by integrating the frequency detection signals for a given interval. The feedback summing device outputs compensated phase deviation signals to the discrimination device by feeding back the noise-compensating signals from the noise-compensating signal generation device to phase deviation signals from the integral discharge filter. The discrimination device outputs demodulation data by discriminating the deviation of the digital modulation signals based on the compensated phase deviation signals. The noise-compensating signal generation device outputs the noise-compensating signals based on the compensated phase deviation signals and the demodulation data. Also, another demodulator for digital modulation signals further comprises a compensation device for interference from preceding data in addition to the above construction. The compensation device for interference from preceding data outputs interference-compensated phase deviation signals by removing the interference from the preceding demodulation data from the compensated phase deviation signals.

7 Claims, 8 Drawing Sheets

DEMODULATOR FOR DIGITAL MODULATION SIGNALS

CROSS REFERENCE TO RELATED APPLICATIONS

This application is a continuation of U.S. application Ser. No. 07/893,579, filed Jun. 4, 1992, abandoned.

BACKGROUND OF THE INVENTION (1) Field of the Invention

The present invention relates to a demodulator for digital modulation signals such as phase modulation and frequency modulation signals incorporated in a modem for digital data transmission through a cable or a radio system.

(2) Description of the Related Art

Demodulators for digital modulation signals such as phase modulation and frequency modulation signals including frequency detectors and integral discharge filters have the advantage over the demodulators including coherent detectors in reducing circuits.

FIG. 1 is a block diagram of a conventional demodulator for the digital modulation signals through MSK (Minimum Shift Keying) and QPSK (Quadrature Phase Shift keying).

The demodulator comprises a frequency detector 41, an integral discharge filter 42, and a decision device 43. The integral discharge filter 42 includes an integrator 44 and a discharge control circuit 45. The frequency detector 41 and integral discharge filter 42 constitute a phase detector which outputs phase deviation signals.

The frequency detector 41 outputs frequency detection signals to the integral discharge filter 42 upon receiving the digital modulation signals, and in turn, the integral discharge filter 42 outputs phase deviation signals to the decision device 43 which outputs demodulation data.

More precisely, having detected frequencies of the digital modulation signals, the frequency detector 41 outputs the frequency detection signals by means of the voltage depending on the deviation thereof to the integral discharge filter 42, which integrates the frequency detection signals for each time slot (transmission time per symbol), meaning that the integrator 44 discharges an electrical charge stored therein as a result of a preceding integration upon receiving a reset signal outputted every time slot from the discharge control circuit 45, and subsequently integrates the frequency detection signals for the following time slot. Thus, the integral discharge filter 42 serving as the phase detector with the frequency detector 41 outputs phase deviation signals to the decision device 43, which discriminates the polarity and/or magnitudes thereof using several thresholds in order to output demodulation data. The demodulator demodulates the frequency modulation signals by detecting the phase deviation based on the frequency modulation signals.

For the digital modulation signals through MSK, the decision device 43 outputs binary demodulation data by means of a voltage corresponding to 0 deviation as a threshold, because their carrier phase deviation is either $+\pi/2$ or $-\pi/2$. For the digital modulation signals through $\pi/4$-shift-QPSK, the decision device 43 outputs quaternary demodulation data by means of voltages corresponding to $+\pi/2$, 0, and $-\pi/2$ deviation as thresholds, because their carrier phase deviation is one of $+3\pi/4$, $+\pi/4$, $-\pi/4$, and $-3\pi/4$.

FIG. 2 shows a block diagram of a conceivable demodulator for digital modulation signals through GMSK (Gaussian Filtered Minimum Shift Keying) with large intersymbol interference due to Gaussian filters.

The demodulator comprises a frequency detector 51, an integral discharge filter 52, a subtracting device 53, a decision device 54, a shift register 55, and a generator 56 for interference signals from preceding data(hereinafter, simply referred to as the interference signals generator 56). The integral discharge filter 52 includes integrators 57 and 58 for 2-bit transmission time(hereinafter, simply referred to as the integrators 57 and 58), an integrator control circuit 59, and a switch 60.

The frequency detector 51 outputs frequency detection signals to the integral discharge filter 52 which outputs phase deviation signals to the subtracting device 53, and the subtracting device 53 subtracts therefrom interference signals from preceding data produced with the shift register 55 and interference signals generator 56, then outputs subtraction results to the decision device 54 which outputs demodulation data.

More precisely, having detected frequencies of digital modulation signals, the frequency detector 51 outputs the frequency detection signals by means of the voltage depending on the deviation thereof to the integral discharge filter 52, which integrates the frequency detection signals for each 2-bit transmission time, meaning that the each integrator 57 and 58 integrates the frequency detection signals for 2-bit transmission time by turns upon alternately receiving a reset signal outputted every 1-bit transmission time from the discharge control circuit 59. The switch 60 controlled by the discharge control circuit 59 switches back and forth, whereby the integral discharge filter 52 outputs phase deviation signals, or the frequency detection signals integrated for 2-bit transmission time, to the subtracting device 53.

Since the modulation signals through GMSK are affected by intersymbol interference caused by the filters of transmitters and receivers, the interference should be removed prior to the input into the decision device 54. For instance, phase deviation signals $X_n$ on the n'th transmission data $S_n$ can be expressed as follows:

{Form 1}

$$X_n = A \times S_{n-2} + B \times S_{n-1} + B \times S_n + A \times S_{n+1}$$

Here, noise affection is not taken into consideration, and $S_{n-2}$ and $S_{n-1}$, and $S_{n+1}$ represent the data preceding and succeeding to $S_n$, respectively, and each data becomes either $+1$ or $-1$. Capital letters A and B represent constant values, such as corresponding values to $\pi/8$ and $3\pi/8$ deviation, respectively, which indicate affection on $S_n$ from the preceding and succeeding data and are determined by modulation methods or filter characteristics.

The Generator 56 outputs the interference signals from preceding data expressed as $A \times S_{n-2} + B \times S_{n-1}$ by means of the voltage depending on the interference to the subtracting device 53, which subtracts the interference signals from preceding data from the phase deviation signals $X_n$, thereby outputting substantially interference-free signals $X_n'$ expressed as $B \times S_n + A \times S_{n+1}$ to the decision device 54. The interference signals from the succeeding data $A \times S_{n+1}$ can not be removed from the signals $X_{n'}$ because $S_{n+1}$ are unknown. Subsequently, the decision device 54 discriminates the polarity and/or magnitudes thereof using a given threshold in order to output demodulation data to outer apparatuses as well as to the shift register 55, which shifts the demodulation data to a bit clock maintaining them for 2-bit transmission time, thereby outputting $S_{n-2}$ and $S_{n-1}$ to the interference signals generator 56, enabling it to produce the interference signals $A \times S_{n-2} + B \times S_{n-1}$.

However, the demodulators described as above do not circumvent the problem of phase lags due to the noise in the digital modulation signals such as a heat noise and a cross talk, which affect the precise operation of decision device 43 and 54, therefore increasing BER (bit error rate) thereof.

In those demodulators, the phase deviation signals $X_k$ of the k'th transmission data include a phase noise $a_k$ expressed as follows:
{Form 2}

$$a_k = e_k - e_{k-1}$$

Here, $e_k$ refers to a phase noise element causing a phase lag between an ideal phase on the k'th transmission data and phase deviation signals $X_k$, while $e_{k-1}$ refers to a phase noise element by a phase lag between an ideal phase on the preceding transmission data, or the k−1'th transmission data, and preceding phase deviation signals $X_{k-1}$ outputted either from the integral discharge filter 42, and in the integral discharge filter 52, $e_{k-1}$ refers to a phase noise element by a phase lag between an ideal phase on the preceding transmission data, or the k−2'th transmission data, and preceding phase deviation signals $X_{k-2}$.

Demodulators having coherent detectors have a phase noise consisting of $e_k$ only, while demodulators having the frequency detectors and integral discharge filters have a synthesized phase noise consisting of $e_k$ and $e_{k-1}$, therefore retaining higher BER.

SUMMARY OF THE INVENTION

The present invention has an object to provide a demodulator for digital modulation signals including a frequency detecting device and an integral discharge filter which is capable of minimizing BER.

The above object is fulfilled by a demodulator for digital modulation signals comprising a frequency detection device, an integral discharge filter, a summing device, a discrimination device, and a noise-compensating signal generation device. The frequency detection device outputs frequency detection signals by detecting frequencies of the digital modulation signals. The integral discharge filter outputs phase deviation signals by integrating the frequency detection signals for a given interval. The summing device outputs compensated phase deviation signals to the discrimination device adding the noise-compensating signals from the generation device for noise-compensating signals to phase deviation signals from the integral discharge filter. The discrimination device outputs demodulation data by discriminating the deviation of the digital modulation signals based on the compensated phase deviation signals. The generation device for noise-compensating signals outputs the noise-compensating signals based on the compensated phase deviation signals and the demodulation data.

With the above construction, the noise-compensating signals based on the demodulation data are fed back to the phase deviation signals from the frequency detecting device and the integral discharge filter, thereby accumulating noise elements of the digital modulation signals. By such an accumulation, noise affection from the preceding data is reduced, improving precise operation of the discrimination device, and therefore minimizing BER.

The above object is also fulfilled by a demodulator for digital modulation signals comprising a frequency detection device, an integral discharge filter, a summing device, a compensation device for interference from preceding data, a discrimination device, and a noise-compensating signal generation device. The frequency detection device outputs frequency detection signals by detecting frequencies of the digital modulation signals. The integral discharge filter outputs phase deviation signals by integrating the frequency detection signals for a given interval. The summing device outputs compensated phase deviation signals to the discrimination device by feeding back the noise-compensating signals from the noise-compensating signal generation device to the phase deviation signals from the integral discharge filter. The compensation device for interference from preceding data outputs interference-compensated phase deviation signals by removing the interference from the preceding demodulation data from the compensated phase deviation signals. The discrimination device outputs demodulation data by discriminating the deviation of the digital modulation signals based on the compensated phase deviation signals. The noise-compensating signal generation device outputs the noise-compensating signals based on the phase deviation signals with compensated interference, demodulated data, and succeeding demodulation data.

Constructed as above, outputting the noise-compensating signals based on the interference-compensated phase deviation signals, demodulation data, and succeeding demodulation data through the summing device makes it possible to remove intersymbol interference of the digital modulation signals, thereby enhancing precise operation of the discrimination device, and therefore minimizing BER.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

(EMBODIMENT I)

Figure 1:
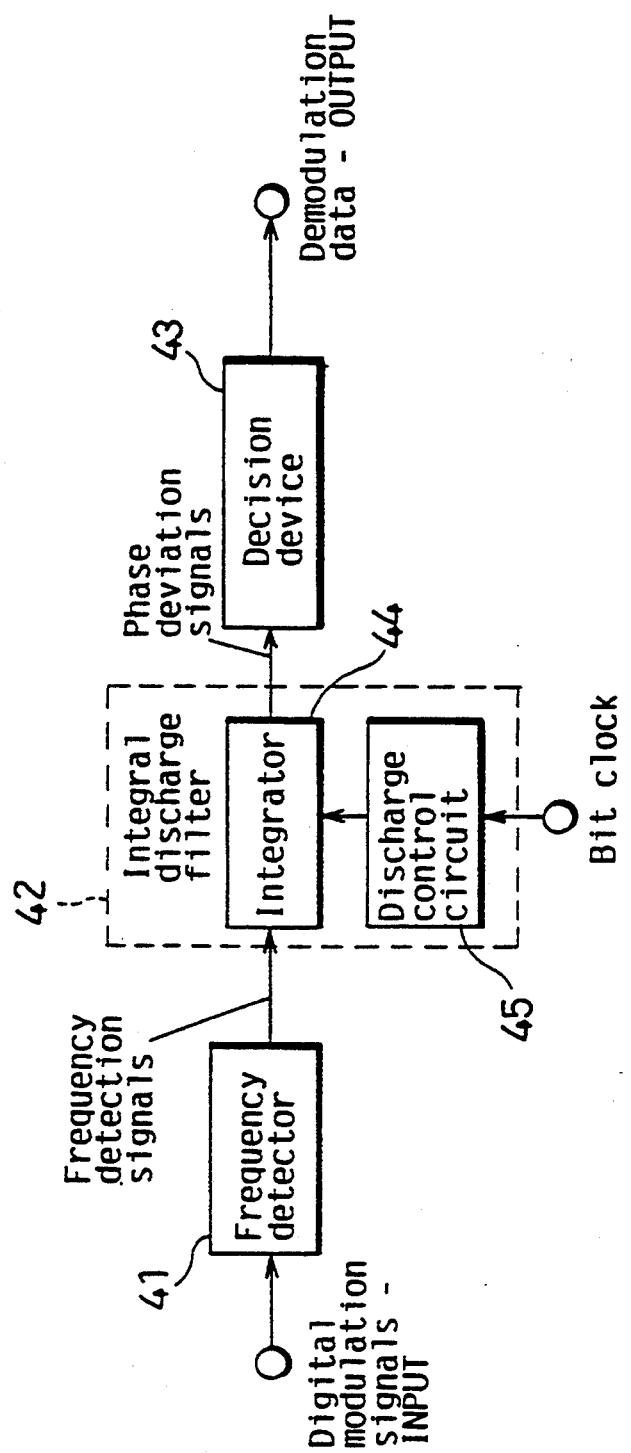
FIG. 1 is a block diagram of a conventional demodulator for digital modulation signals.
Figure 2:
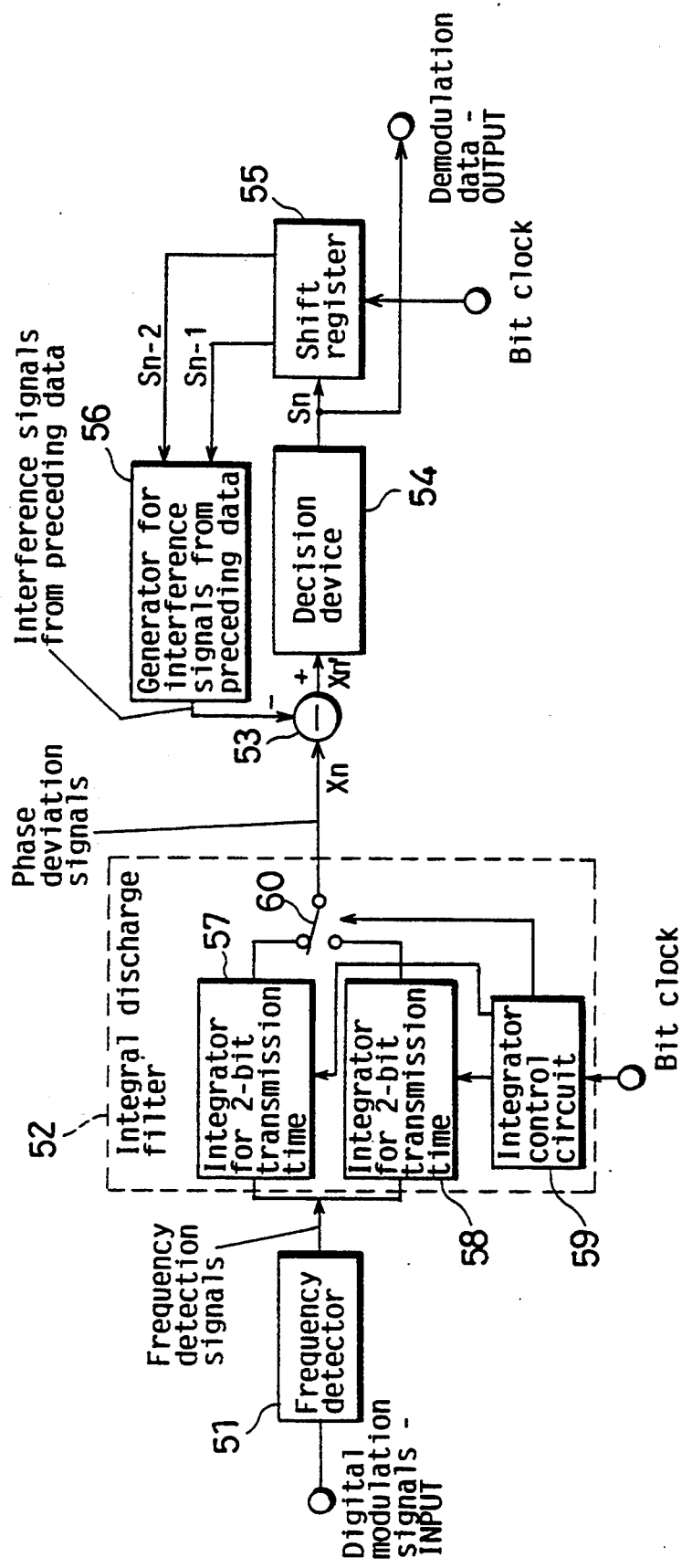
FIG. 2 is a block diagram of a conventional demodulator for digital modulation signals with large intersymbol interference.
Figure 3:
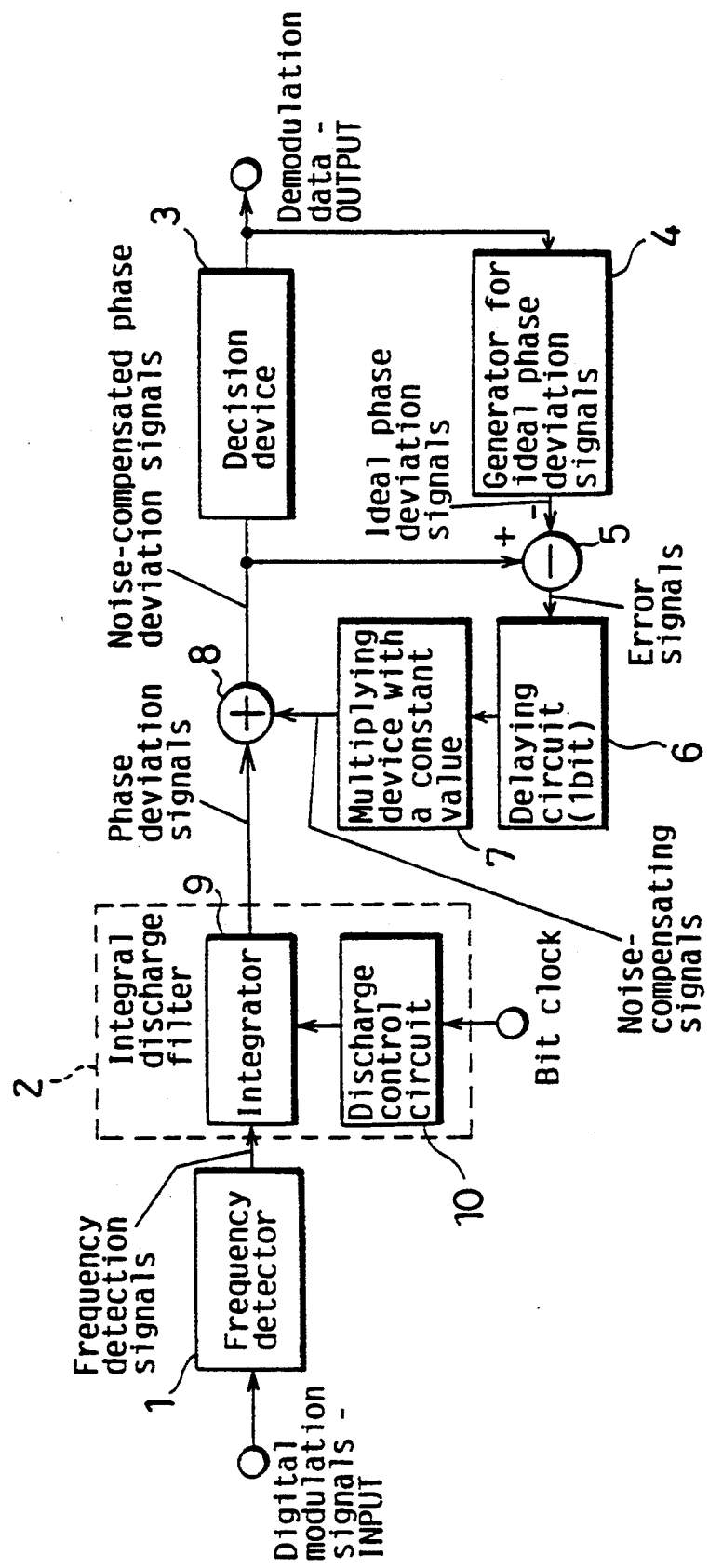
FIG. 3 is a block diagram of a demodulator for digital modulation signals in Embodiment I.

A demodulator for digital modulation signals through MSK or QPSK is described hereunder with referring to FIG. 3.

The demodulator comprises a frequency detector 1 such as a ratio detector, an integral discharge filter 2, a decision device 3, a generator 4 for an ideal phase deviation signals(hereinafter, simply referred to as the generator 4, a subtracting device 5, a delaying circuit 6, a multiplying device 7 with a constant value (hereinafter, simply referred to as the multiplying device 7), and an adding device 8.

The integral discharge filter 2 includes an integrator 9 and a discharge control circuit 10. The frequency detector 1 and integral discharge filter 2 constitute a phase detector which outputs phase deviation signals. The decision device 3 includes at least one comparator. The delaying circuit 6 includes a switched capacitor, delaying lines, and the like for delaying analogue signals and the multiplying device 7 includes an attenuator.

Constructed as above, the demodulator outputs the demodulation data on the digital modulation signals as follows.

Having detected frequencies of the digital modulation signals, the frequency detector 1 outputs frequency detection signals by means of the voltage depending on their deviation to the integral discharge filter 2, which integrates the frequency detection signals for each time slot, meaning that the integrator 9 discharges an electrical charge stored therein as a result of a preceding integration upon receiving a reset signal outputted every time slot from the discharge control circuit 10, and subsequently integrates the frequency detection signals for the following time slot. Thus the integral discharge filter 2 serving as the phase detector with the frequency detector 1 outputs phase deviation signals to the adding device 8. The demodulator demodulates the frequency modulation signals by detecting the phase deviation based on the frequency modulation signals. Then, in order to remove a noise causing a phase lag, the adding device 8 feeds back noise-compensating signals based on the demodulation data from the multiplying device 7 to the phase deviation signals, thereby outputting noise-compensated phase deviation signals to the decision device 3. The decision device 3 discriminates the polarity and/or magnitudes thereof using at least one threshold in order to output the demodulation data to outside apparatuses as well as to the generator 4, which outputs ideal phase deviation signals, or ideal voltages based on the demodulation data, to the subtracting device 5.

For instance, the decision device 3 outputs the digital modulation signals through MSK in binary demodulation data by means of a voltage corresponding to 0 deviation as a threshold, because their carrier phase deviation is either $+\pi/2$ or $-\pi/2$. Subsequently, the generator 4 outputs an ideal deviation signals by means of a voltage corresponding to $+\pi/2$ or $-\pi/2$ deviation. Or the decision device 3 outputs the digital modulation signals through $\pi/4$-shift-QPSK in quaternary demodulation data by means of the voltages corresponding to $+\pi/2$, 0, and $-\pi/2$ deviation as thresholds, because their carrier phase deviation is one of $+3\pi/4$, $+\pi/4$, $-\pi/4$, and $-3\pi/4$. Subsequently, the generator 4 outputs ideal deviation signals by means of a voltage corresponding to $+3\pi/4$, $+\pi/4$, $-\pi/4$, and $-3\pi/4$ deviation.

Upon receiving the ideal phase deviation signals, the subtracting device 5 outputs error signals to the delaying circuit 6 by subtracting the ideal phase deviation signals from the noise-compensated phase deviation signals from the adding device 8. The delaying circuit 6 delays the error signals to the multiplying device 7 for 1 time slot, which outputs the noise-compensating signals to the adding device 8 by multiplying the delayed error signals with a given constant value $\alpha$, thus, enabling the adding device 8 to output the noise-compensated phase deviation signals to the decision device 3.

Figure 4:
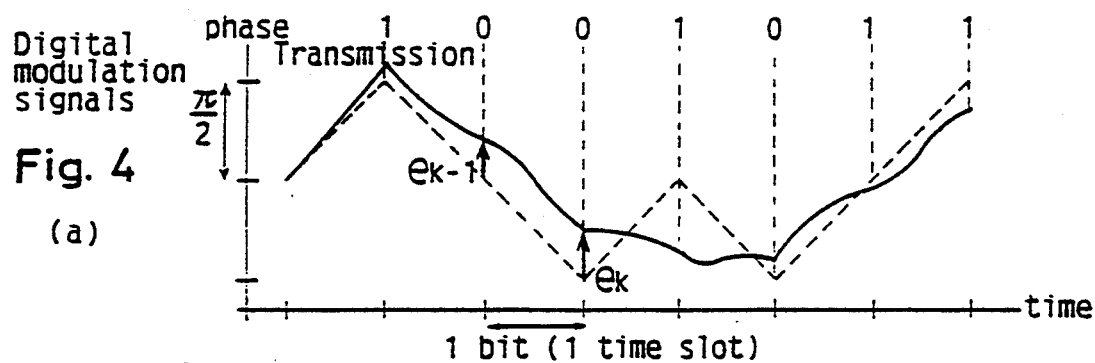
FIG. 4 shows phase and frequency characteristics of signals outputted in Embodiment I.
Figure 4:
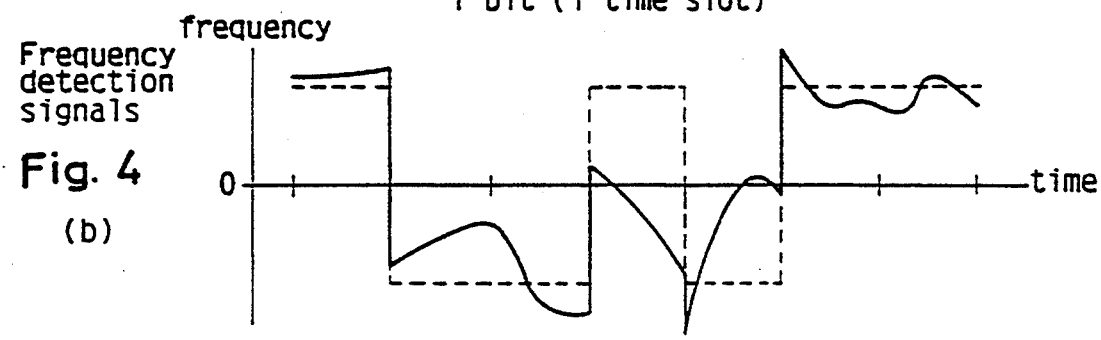
Figure 4:
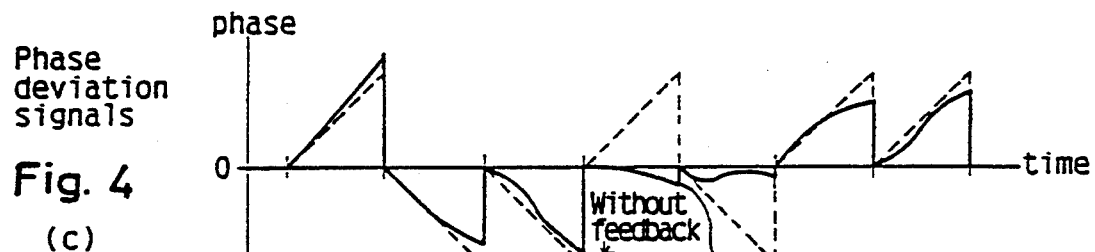
Figure 4:
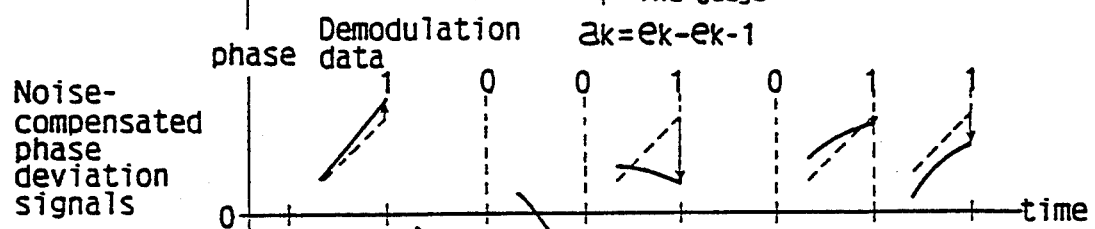
Figure 4:
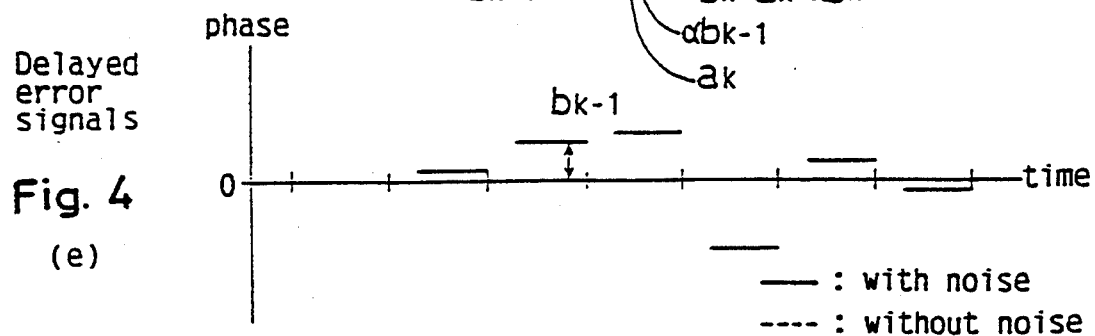

In FIG. 4, phase and frequency characteristics of aforementioned signals are shown, in which a dashed line refers to a signal without a noise.

The inputted digital modulation signals (a) are outputted as frequency signals (b) and the integrated frequency detection signals are outputted as the phase deviation signals (c). Here, the phase deviation signals $X_k$ on the k'th transmission data include a phase noise $a_k$ expressed as follows:

{Form 3}

$$a_k = e_k - e_{k-1}$$

In Form 3, $e_k$ refers to a phase noise element causing a phase lag between an ideal phase on the k'th transmission data and phase deviation signals $X_k$, while $e_{k-1}$ refers to a phase noise element caused by a phase lag between an ideal phase on the preceding transmission data, or the k−1'th transmission data, and preceding phase deviation signals $X_{k-1}$ from the integral discharge filter 2.

As previously mentioned, the adding device 8 outputs the noise-compensated phase deviation signals (d) by adding the phase deviation signals (c) and the delayed error signals for 1 time slot expressed as $b_{k-1}$ (e) multiplied with the constant value $\alpha$, therefore, the error signals $b_k$ in the noise-compensated phase deviation signals are expressed as:

{Form 4}

$$b_k = a_k + \alpha \times b_{k-1}$$

With Forms 3 and 4, the error signals $b_k$ are further expressed as:

$$b_k = e_k - (1-\alpha) \sum_{m=1}^{\infty} \alpha^{m-1} e_{k-m} \qquad \text{Form 5}$$

It is apparent from Form 5 that when the absolute value of the constant value $\alpha$ is a number less than 1, the error signals $b_k$ converges, therefore, reducing affection of other phase noise elements such as $e_{k-1}$.

Moreover, it is preferable to have a positive number as $\alpha$. Generally all the phase noise elements are independent and random variables, therefore the average thereof is 0. Then when these elements have dispersion of $\sigma^2$, the dispersion $V_b$ of the error signals $b_k$ are expressed as:

$$\begin{aligned} V_b &= \sigma^2 + (1-\alpha)^2 \sum_{m=1}^{\infty} \alpha^{2(m-1)} \sigma^2 \\ &= 2\sigma^2/(1+\alpha) \end{aligned} \qquad \text{Form 6}$$

When the noise-compensating signals expressed as $\alpha \times b_{k-1}$ are not fed back to the phase deviation signals $X_k$, the dispersion $V_b$ is $2\sigma^2$ from Form 3, meaning that when the noise-compensated signals are fed back to the phase deviation signals $X_k$, the dispersion $V_b$ becomes one $(1+\alpha)$th compared with the one without the feedback.

From Forms 5 and 6, it can be said that it is most preferable to have a positive number less than 1 as $\alpha$.

It should be noted therefore that feeding back the noise-compensating signals to the phase deviation signals makes it possible to obtain smaller dispersion of the error signals, thereby improving the precise operation of the decision device 3, further resulting in minimizing BER.

Although any positive number less than 1 can be $\alpha$, it is preferable to have a smaller number when constant error signals of circuits incorporated in the demodulator are large for the prevention of the dispersion, while a large number, or substantially 1, is preferable when the constant error signals of circuits incorporated in the demodulator are small for the further prevention effect.

In the embodiment, the generator 4 includes a multiplying device for multiplying the demodulation data by a given value in order to output the ideal phase deviation signals, or the ideal voltages, however, it may comprise a D/A convertor or a voltage generator and an analogue switch for controlling the outputs therefrom in accordance with the demodulation data.

(EMBODIMENT II)

Figure 5:
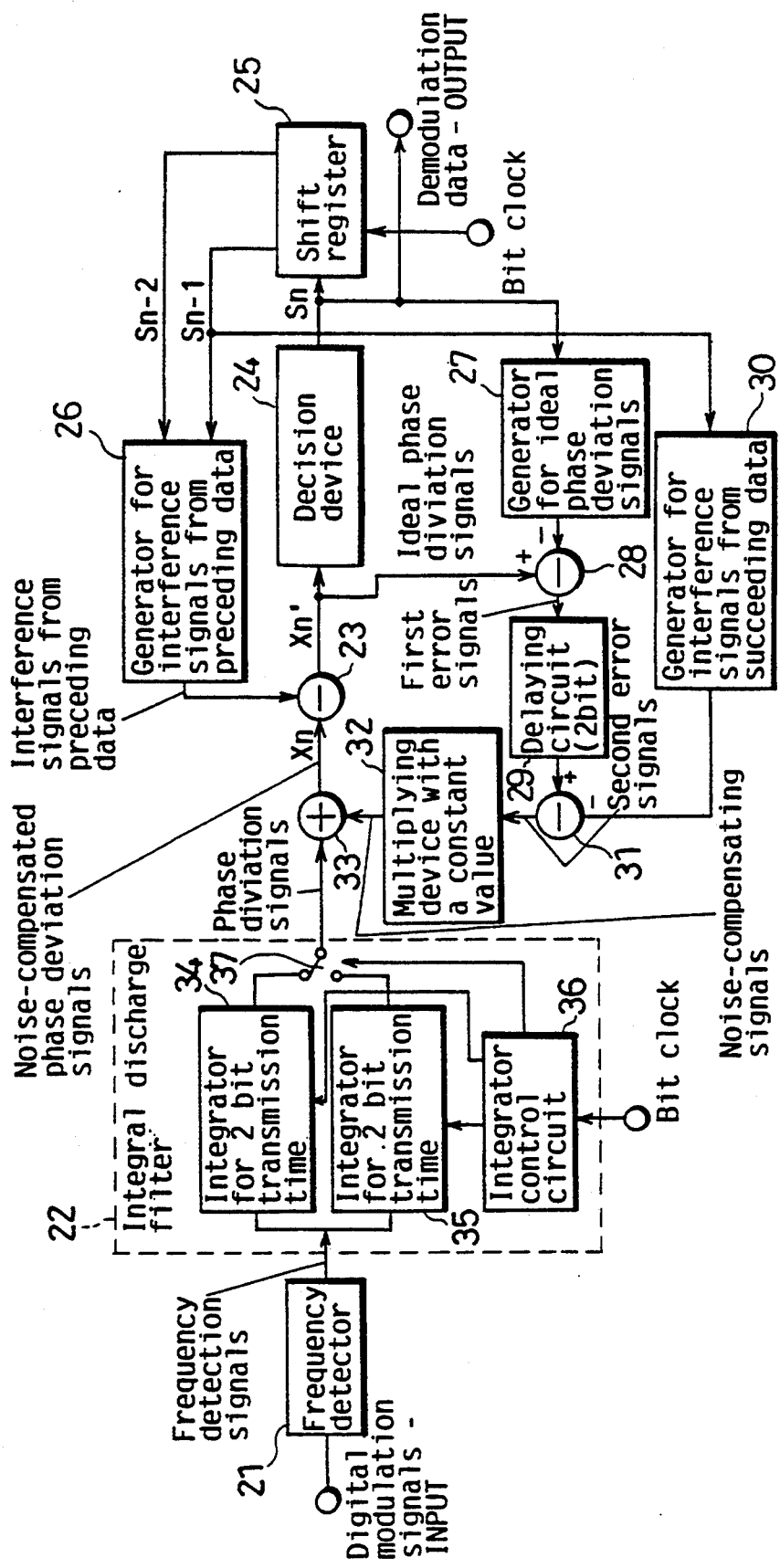
FIG. 5 is a block diagram of a demodulator for digital modulation signals in Embodiment II.

A demodulator for digital modulation signals through GMSK with large intersymbol interference due to Gaussian filters or the like is described hereunder with referring to FIG. 5.

The demodulator, as the one in Embodiment I, can minimize BER by feeding back the error signals to the phase deviation signals, in addition, it is constructed so that appropriate error signals can be fed back in order to remove the intersymbol interference in the modulation digital signals.

The demodulator comprises a frequency detector 21, an integral discharge filter 22, a first subtracting device 23, a decision device 24, a shift register 25, a generator 26 for interference signals from preceding data (hereinafter, simply referred to as the generator 26), a generator 27 for ideal phase deviation signals (hereinafter, simply referred to as the generator 27), a second subtracting device 28, a delaying circuit 29, a generator 30 for interference signals from succeeding data (hereinafter, simply referred to as the generator 30), a third subtracting device 31, a multiplying device 32 with a constant value (hereinafter, referred to the multiplying device 32), and an adding device 33. The integral discharge filter 22 include integrators 34 and 35 for 2-bit transmission time (hereinafter, simply referred to as the integrators 34 and 35), an integrator control circuit 36, and a switch 37.

Constructed as above, the demodulator outputs the demodulation data on the digital modulation signals as follows.

Having detected frequencies of digital modulation signals, the frequency detector 21 outputs frequency detection signals with the voltage depending on the deviation thereof to the integral discharge filter 22, which integrates the frequency detection signals for each 2-bit transmission time, meaning that each integrator 34 and 35 integrates the frequency detection signals for 2-bit transmission time by turns upon alternately receiving a reset signal outputted every 1-bit transmission time from the discharge control circuit 36. The switch 37 controlled by the discharge control circuit 36 switches back and forth, whereby the integral discharge filter 22 outputs phase deviation signals, or the frequency detection signals integrated for 2-bit transmission time, to the adding device 33. The adding device 33 outputs noise-compensated phase deviation signals to the first subtracting device 23 by adding the phase deviation signals and noise-compensating signals from the multiplying device 32 based on the demodulation data. The first subtracting device 23 subtracts therefrom interference signals from the preceding data and outputs the subtraction results to the decision device 24. For instance, the n'th transmission data $S_n$ outputted as phase deviation signals $X_n$ can be expressed as Form 1 in the Description of the Related Art.

The generator 26 outputs the interference signals from preceding data by means of the magnitudes depending on the interference expressed as $A \times S_{n-2} + B \times S_{n-1}$ to the first subtracting device 23, which subtracts the interference signals from the preceding data from the phase deviation signals $X_n$, thereby outputting signals $X_{n'}$ expressed as $B \times S_n + A \times S_{n+1}$ to the decision device 24. The interference signals from the succeeding data $A \times S_{n+1}$ can not be removed from the signals $X_{n'}$ because $S_{n+1}$ are unknown. Subsequently, the decision device 24 discriminates the polarity and/or magnitudes thereof using a given threshold in order to output demodulation data to outer apparatuses such as receivers as well as to the shift register 25, and generator 27. The shift register 25 shifts the demodulation data to a bit clock maintaining them for 2-bit transmission time, thereby outputting $S_{n-1}$ to the generator 30 as well as outputting $S_{n-2}$ and $S_{n-1}$ to the generator 26, enabling it to produce the interference signals $A \times S_{n-2} + B \times S_{n-1}$ with two multiplying circuits and an adding circuit included therein. The generator 27 having the same construction as the generator 4 in Embodiment I outputs ideal phase deviation signals by means of an ideal voltage based on the demodulation data, or $B \times S_n$, to the second subtracting device 28. The second subtracting device 28 subtracts the ideal phase deviation signals from the signals $X_{n'}$ from the first subtracting device 23, thereby outputting the first error signals including $A \times S_{n+1}$ to the delaying circuit 29. The delaying circuit 29 delays the first error signals for 2-bit transmission time to the third subtracting device 31. In the mean time, the shift register 25 outputs signals based on $S_{n-1}$ to the generator 30, whereby the generator 30 including an adding device outputs signals by means of a voltage depending on the interference signals $A \times S_{n-1}$ to the third subtracting device 31. Then, the third subtracting device 31 subtracts the interference signals $A \times S_{n-1}$ outputted from the generator 30 from the first error signals including $A \times S_{n+1}$ delayed for 2-bit transmission time from the delaying circuit 29, thereby outputting the subtraction results to the multiplying device 32 as second error signals, which are not affected by the interference from the preceding and succeeding data to $S_n$. The multiplying device 32 outputs noise-compensating signals to the adding device 33 by multiplying the second error signals with a constant value $\alpha$.

Thus, forms 5 and 6 can be applied to Embodiment II, meaning that having a positive $\alpha$ less than 1 makes it possible to attenuate the phase noise element $e_{k-1}$ as well as to obtain smaller dispersion of the error signals, further improving the precise operation of the decision device 24, and resulting in minimizing BER.

(EMBODIMENT III)

Figure 6:
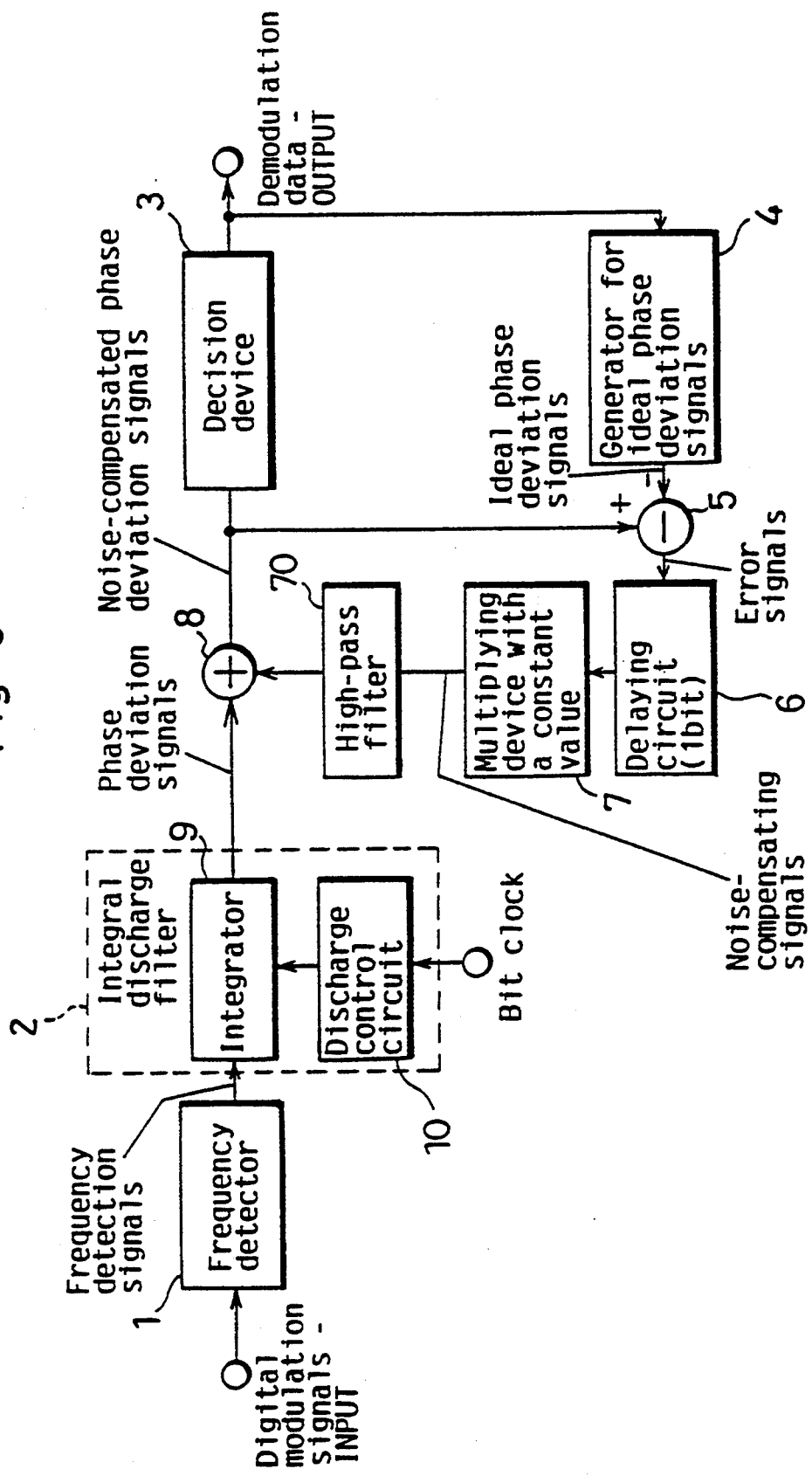
FIG. 6 is a block diagram of a demodulator for digital modulation signals in Embodiment III.

A demodulator for digital modulation signals including a frequency offset is shown in FIG. 6.

The demodulator has the same construction as the one of Embodiment I except that a high-pass filter 70 is installed between the multiplying device 7 and adding device 8 in order to attenuate direct-current elements to $1/\beta$.

In this demodulator, the phase deviation signals have constant error signals expressed as $T \times f$, provided that T refers to integral time in the integral discharge filter 2, and f refers to an offset of the frequency detection signals.

For instance, the phase deviation signals of the k'th transmission data have error signals $c_k$, which are produced by adding the constant error signals $T \times f$ to the multiple of the error signals on the preceding data $c_{k-1}$ by $\alpha/\beta$, thus, expressed as:

{Form 7}

$$c_k = T \times f + (\alpha/\beta) \times c_{k-1}$$

Therefore, a constant value E of the error signals $c_k$ is expressed as:

{Form 8}

$$E = T \times f/(1 - \alpha/\beta)$$

As previously mentioned, although $\alpha$ is a positive number less than 1, affection of frequency offset due to the feedback can be prevented by making $\beta$ larger. In addition, it is particularly effective in reducing the phase noise affection to use a high-pass filter 70 having lower cut-off frequency compared with transmission bit rate.

(EMBODIMENT IV)

Figure 7:
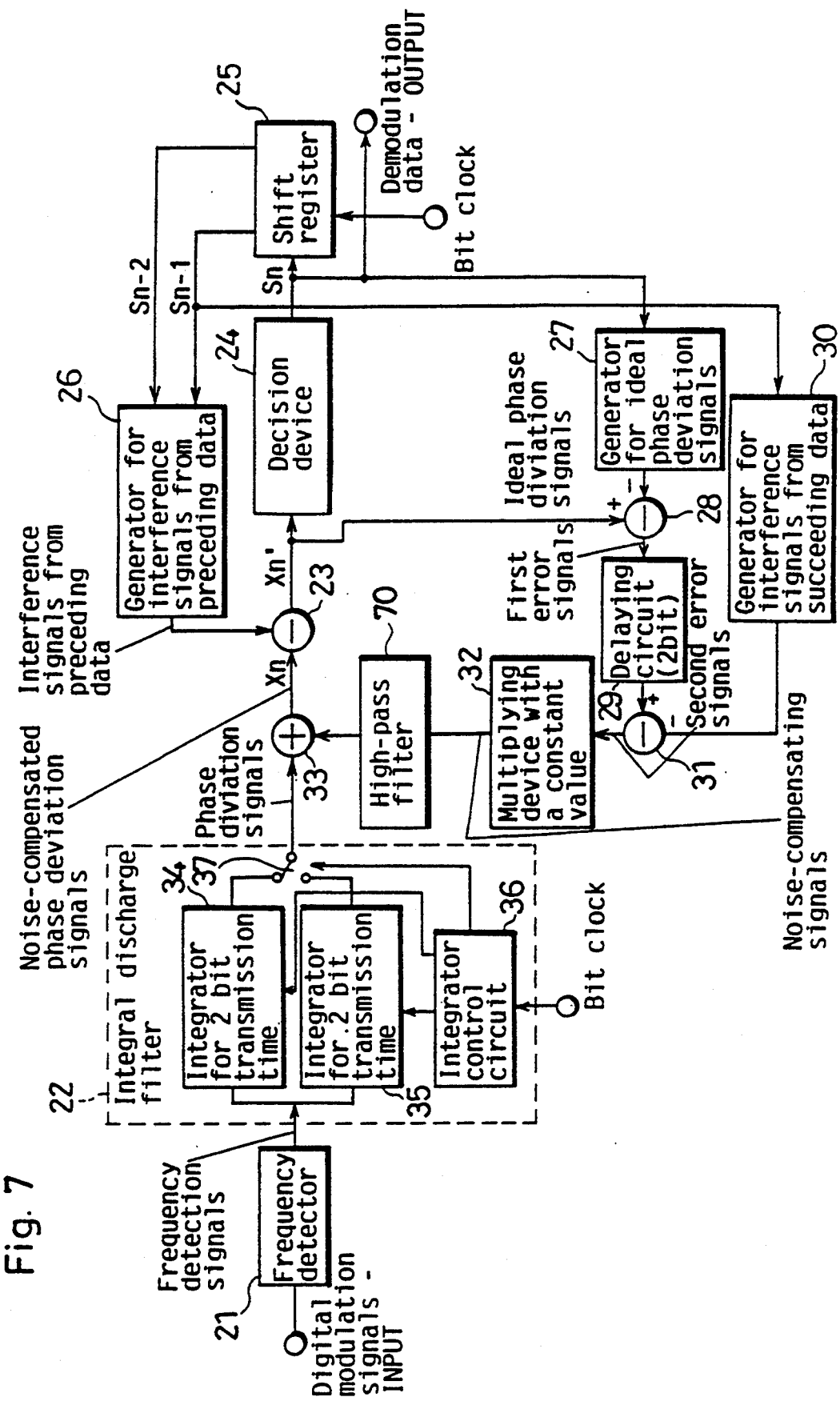
FIG. 7 is a block diagram of a demodulator for digital modulation signals in Embodiment IV.

Another demodulator for digital modulation signals including an frequency offset is shown in FIG. 7.

The demodulator has the same construction as the one of Embodiment II except that a high-pass filter 70 is installed between the multiplying device 32 and adding device 33 in order to attenuate direct-current elements to $1/\beta$.

Like the demodulator of Embodiment III, the demodulator is also able to decrease phase noise affection as well as restrain the frequency offset affection.

Figure 8:
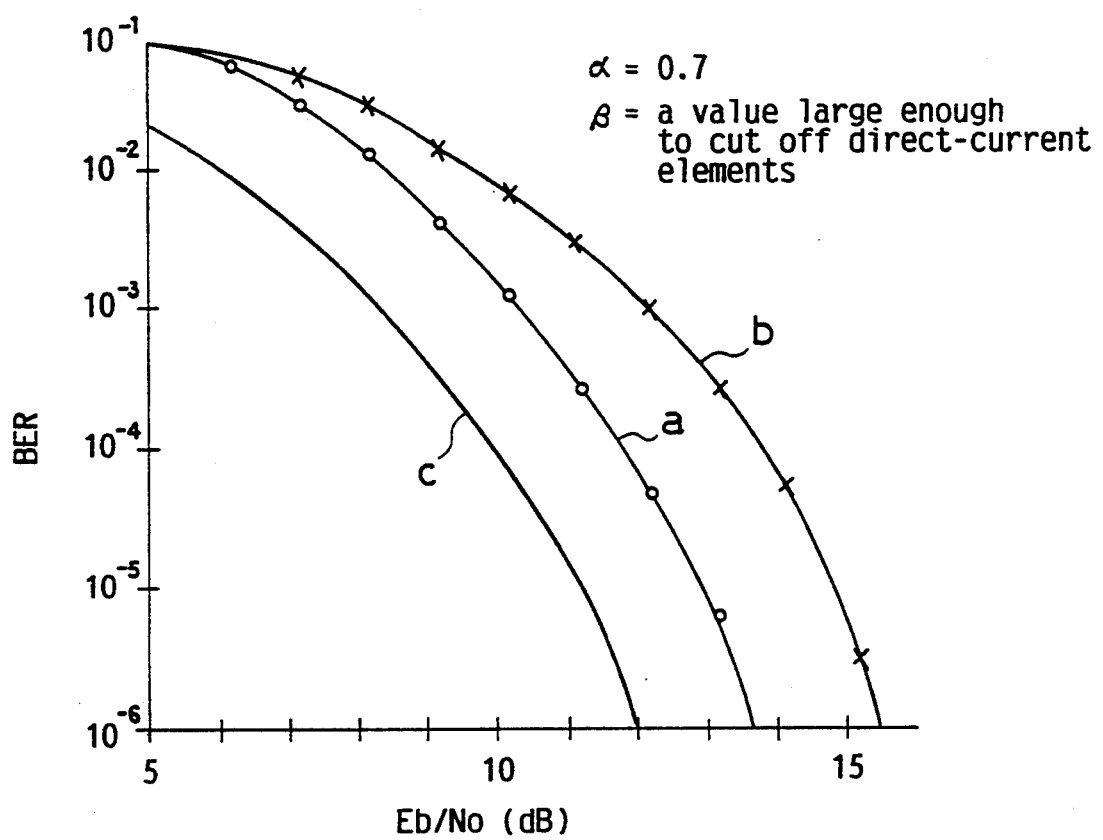
FIG. 8 shows BER characteristics to Eb/No (Bit energy to noise power spectral density).

FIG. 8 shows a correlation between BER characteristics and Eb/No (Bit energy to Noise power density). Here, $\alpha$ is 0.7, $\beta$ is a value which is large enough to cut off direct-current elements. The digital data are modulated through GMSK with a low-pass filter having the product BT of 0.25 at the modulation speed with 32 kbit/sec. In FIG. 8, a curve (a), a curve (b), and a curve (c) represent the demodulator of Embodiment IV, a demodulator without the error signals feedback, and a demodulator including an coherent detector, respectively. Data source for curve (c) is "Transmission Characteristics by GMSK" by Murata/Hirade, Denshi-Tsushin Gakkai Ronbunshyu (B), J64B, Vol. 10 and Vol. 11, pages 23 to 1130. October, 1981.

It is apparent from FIG. 8 that BER characteristics of the demodulator of the present invention is superior to that of the one without the error signals feedback by approximately 2 db, whereas it is similar to that of the one including the coherent detector while maintaining the construction compact.

Although the digital modulation signals through MSK, QPSK, and GMSK are demodulated in the above embodiments, other modulation method which do not reduce amplitude such as 4-level FM is applicable to the present invention.

The noise-compensating signals are not necessarily fed back to the phase deviation signals, and the delaying circuit can be connected to any place as long as the demodulator has construction to accumulate the noise-compensating signals. Also, current can be applied instead of voltage.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A demodulator for demodulating a digital modulation signal comprising:
   frequency detection means for outputting a frequency detection signal by detecting frequencies of the digital modulation signal;
   an integral discharge filter outputting a phase deviation signal by integrating the frequency detection signal for a predetermined interval;
   summing means for outputting a noise-compensated phase deviation signal by adding a multiplied noise compensating signal and the phase deviation signal;
   discrimination means for outputting demodulation data by discriminating deviations of the digital modulation signal based on the noise-compensated phase deviation signal;
   error signal generation means for generating an error signal based on the noise-compensated phase deviation signal and the demodulation data; and
   delaying means for outputting a noise-compensating signal by delaying the error signal for the predetermined interval necessary for the integral discharge filter to integrate the frequency detection signal to output the phase deviation signal; and
   multiplying means for multiplying the noise-compensating signal from the delaying means by a predetermined positive number less than one to supply the multiplied noise compensating signal to the summing means.

2. The demodulator of claim 1, the demodulator further comprising a high-pass filter for filtering out direct-current components from the multiplied noise compensating signal before feeding the multiplied noise compensating signal to the summing means.

3. A demodulator for demodulating a digital modulation signal comprising:
   frequency detection means for outputting a frequency detection signal by detecting frequencies of the digital modulation signal;
   an integral discharge filter outputting a phase deviation signal by integrating the frequency detection signal for a predetermined interval;
   summing means for outputting a noise-compensated phase deviation signal by adding a noise-compensating signal and the phase deviation signal;

discrimination means for outputting demodulation data by discriminating deviations of a digital modulation signal based on the noise-compensated phase deviation signal; and noise-compensating signal generation means for outputting the noise-compensating signal based on the noise-compensated phase deviation signal and the demodulation data, the noise-compensating signal generation means comprising:

means for outputting an ideal phase deviation signal based on the demodulation data, the ideal phase deviation signal corresponding to an interference-free phase deviation signal capable of producing the demodulation data if input to the discrimination means;

phase error generation means for outputting an error signal by subtracting the ideal phase deviation signal from the noise-compensated phase deviation signal;

delaying means for outputting a delayed error signal by delaying the error signal from the phase error generation means for the predetermined interval that the integral discharge filter integrates the frequency detection signal; and multiplying means for outputting the noise-compensating signal by multiplying the delayed error signal by a predetermined positive number less than 1.

4. The demodulator of claim 3, further comprising a high-pass filter for filtering out direct-current components from the noise compensating signal.

5. A demodulator for demodulating a digital modulation signal comprising:

frequency detection means for outputting a frequency detection signal by detecting frequencies of the digital modulation signal;

an integral discharge filter for outputting a phase deviation signal by integrating the frequency detection signal for a predetermined interval;

summing means for outputting a noise-compensated phase deviation signal by adding a noise compensating signal and the phase deviation signal;

compensating means for compensating for interference from preceding demodulation data, the compensating means outputting an interference-compensated phase deviation signal by removing an interference resulting from the preceding demodulation data from the noise-compensated phase deviation signal;

discrimination means for outputting demodulation data by discriminating deviations of the digital modulation signal based on the interference-compensated phase deviation signal;

error signal generation means for generating an error signal based on the noise-compensated phase deviation signal and the demodulation data, the error signal generation means comprising:

generation means for outputting an ideal phase deviation signal based on the demodulation data, the ideal phase deviation signal corresponding to an interference-free phase deviation signal capable of yielding the demodulation data if input to the discrimination means; and phase error generation means for outputting the error signal by subtracting the ideal phase deviation signal from the noise-compensated phase deviation signal; means for generating a succeeding data interference signal from succeeding demodulation data, the succeeding data interference signal based on an interference caused by the succeeding demodulation data;

delaying means for delaying the error signal for the predetermined interval necessary for the integral discharge filter to integrate the frequency detection signal to output the phase deviation signal; and computation means for outputting the noise compensating signal by subtracting the succeeding data interference signal from the delayed error signal.

6. The demodulator of claim 5, further comprising multiplying means for outputting a multiplied signal by multiplying the noise-compensating signal from the delaying means by a predetermined positive number less than one to output the multiplied signal to the summing means.

7. The demodulator of claim 5, further comprising a high-pass filter for filtering out direct-current components from the noise compensating signal.

* * * * *